March 13, 1928. 1,662,123

P. G. MYERS
METHOD AND APPARATUS FOR DIFFUSING AND COLORING
REFLECTED RAYS OF LIGHT
Filed Aug. 1, 1923

Inventor
P. G. Myers
By Frease and Bond, Attorneys

Patented Mar. 13, 1928.

1,662,123

UNITED STATES PATENT OFFICE.

PARKE G. MYERS, OF CANTON, OHIO, ASSIGNOR TO THE AUTOMATIC SIGNAL & SIGN COMPANY, OF CANTON, OHIO, A CORPORATION OF OHIO.

METHOD AND APPARATUS FOR DIFFUSING AND COLORING REFLECTED RAYS OF LIGHT.

Application filed August 1, 1923. Serial No. 655,100.

The invention relates to signaling devices adapted to be located at dangerous points along a roadway and at the crossings of roads and railroads; and this application is a continuation in part of my pending application filed June 27, 1921, Serial No. 480,902 which is a division of my application which matured in Patent No. 1,386,893, granted August 9, 1921 for a danger signal, and relates more particularly to the reflector which forms a part of the signaling device.

The object of the improvement is to color as well as to diffuse rays of light received from the headlight of an approaching vehicle and reflected back to the operator of the vehicle, or to the operator of another vehicle approaching from another direction.

In reflecting rays of light, difficulty has been experienced in diffusing the same so as to uniformly cover a limited area in the general direction of the source of the light, as for instance the width of a roadway and a short distance on each side thereof; and applicant has discovered that this difficulty is overcome by forming the face of the reflector with a multiplicity of inclined surfaces, which may be and preferably are the sides of contiguous shallow pyramids.

Furthermore, in reflecting rays of light through a transparent medium associated with a coloring medium, difficulty is experienced in preventing the rays from being reflected from the face of the transparent medium without passing through the coloring medium, thereby reflecting a white or an uncolored light; and applicant has discovered that this difficulty is overcome by forming the face of the transparent medium with a plurality or a multiplicity of inclined faces, from which the rays of light will not be reflected, but will pass through the transparent and coloring mediums to and from the reflecting medium.

The invention is illustrated in the accompanying drawings forming part hereof, in which—

Figure 1:
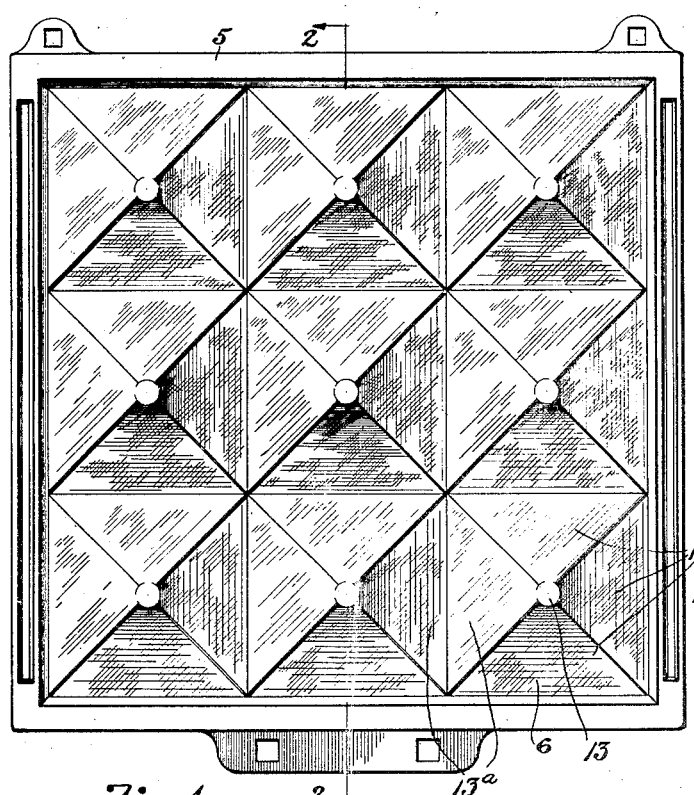
Figure 4:
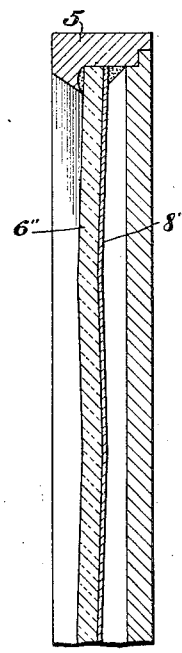
Figures 2, 3:
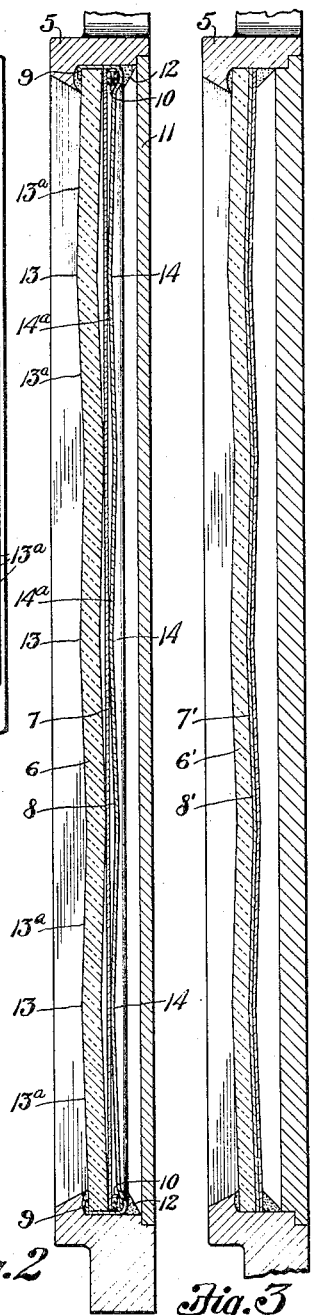

Figure 1 is a front elevation of a signaling appliance embodying the invention;

Fig. 2, a vertical section thereof on line 2—2, Fig. 1, showing the transparent, the coloring and reflecting mediums as separate elements;

Fig. 3, a similar section showing the coloring medium as an integral lamination of the transparent medium, with the reflecting medium applied immediately to the back thereof; and Fig. 4, a portion of a similar section showing the coloring medium associated with a transparent medium as a pigment therein, with a reflecting medium applied to the back thereof.

Similar numerals refer to similar parts throughout the drawings.

The transparent, coloring and reflecting mediums may be mounted in a frame 5 and may be and preferably are made as separate elements, as shown in Fig. 2, wherein the transparent medium 6 is in the form of a plate or sheet of clear transparent glass, the coloring medium 7 is in the form of a thin sheet of colored pyralin or other like material, and the reflecting medium 8 is in the form of a sheet or plate of polished metal.

In this form of the invention the edges of the reflecting plate 8 may be provided with flanges 9 adapted to be folded around the edges of the coloring sheet and transparent plate, with a packing ring 10 to cushion the contact of the reflecting plate with the edges of the pyralin sheet, to hold the three elements in contacting relation; and the three elements thus combined may be secured in the frame 5 by means of a back plate 11 and a suitable sealing cement 12 at the rim of the frame.

In the preferred form of the device the clear glass transparent plate 6 may be pressed to form a plurality of contiguous shallow pyramids 13 on its front face, the sides 13ª of which produce a multiplicity of surfaces inclined to the general plane of the plate and permit rays of light to pass through the transparent medium and the colored medium associated therewith without being reflected directly from the front face thereof.

And in the preferred form of the device the colored transparent pyralin may be formed as a flat sheet; the reflecting plate 8 may be pressed to form a plurality of contiguous shallow pyramids 14 on its face substantially like the face of the transparent medium; and these pyramids are highly polished to form a multiplicity of reflecting surfaces for diffusing the rays of light which pass through the transparent and coloring mediums to and from the reflecting medium.

It has been discovered that when the sides 14ª of the pyramids are inclined at a rate of less than one per cent from the plane of the bases thereof, the diffusion of the rays of light will not be sufficient for the purpose intended; and that when the inclination of the sides of the pyramids is at a rate of more than some five per cent from the plane of the bases thereof, there is too great a diffusion of light for the purpose intended; so that it is preferred to make the inclination of the multiplicity of pyramidal faces on the reflector at a rate of about three per cent from the general plane of the plate.

In the modified form of the improvement shown in Fig. 3, the transparent medium 6' may be made of a glass plate with its front face shaped with a multiplicity of inclined pyramidal surfaces substantially as described for the front face of the transparent plate 6, and with its back face pressed with a multiplicity of recessed pyramidal surfaces parallel therewith; and in this form of the device the coloring medium 7' may be made as an integral colored lamination of the plate, and the reflecting medium 8' may be in the form of a coating of silver or the like applied directly to the back surface of the glass plate.

And in the modified form of the device shown in Fig. 4, the coloring medium may be in the form of a pigment permeating the entire body of the transparent plate 6", which is pressed with a multiplicity of inclined faces upon its front and back face as described above; upon the back of which may be directly applied the reflecting medium 8" in the form of silver or the like.

In each of the several forms of the device illustrated and described, rays of light pass freely through the plurality of inclined surfaces presented by .e transparent medium, thence through the body of the same and through the colored medium associated therewith to the multiplicity of inclined faces presented by the face of the reflecting medium; whence they are diffused and reflected back through the transparent medium in the general direction whence they came, carrying with them the appearance of color imparted by the coloring medium.

It will be understood that the plurality of inclined surfaces on the face of the transparent medium need not be made in the same form, number, inclination or arrangement as the multiplicity of inclined surfaces on the face of the reflecting medium; the essential thing being to form the front face of the transparent medium so that no considerable part of it will be parallel with the general plane of the sheet.

I claim:

1. The method of coloring rays of reflected light which consists in passing the same through a coloring medium associated with a plane transparent medium having its faces composed of a plurality of inclined surfaces, to and from a reflecting medium located in a plane parallel with the transparent medium.

2. The method of coloring and diffusing rays of reflected light which consists in passing the same through a coloring medium having its faces composed of a plurality of inclined surfaces associated with a plane transparent medium, to and from a reflecting medium located in a plane parallel with the transparent medium and having a face composed of a multiplicity of inclined facets.

3. The method of coloring and diffusing rays of reflected light which consists in passing the same through a coloring medium having its faces composed of a plurality of inclined surfaces associated with a transparent medium, to and from a reflecting medium having a face composed of a multiplicity of pyramidal facets.

4. The method of coloring and diffusing rays of reflected light which consists in passing the same through a coloring medium associated with a transparent medium having its faces composed of a plurality of inclined faces, to and from a reflecting medium having a face composed of a multiplicity of inclined facets.

5. A reflector for rays of light including a transparent medium pressed to form a plurality of contiguous shallow pyramids, a coloring medium associated with the transparent medium and a reflecting medium back of the transparent and coloring mediums.

6. A reflector for rays of light including a transparent medium pressed to form a plurality of contiguous shallow forms, a coloring medium associated with the transparent medium and a reflecting medium back of the transparent and coloring mediums, the face of the reflecting medium being composed of a multiplicity of inclined facets.

7. A reflector for rays of light including a transparent medium, a coloring medium associated with the transparent medium and a reflecting medium back of the transparent and coloring mediums, the face of the reflecting medium being composed of a multiplicity of pyramidal facets.

8. A reflector for rays of light including a transparent medium, a coloring medium associated with the transparent medium and a reflecting medium back of the transparent and coloring mediums, the transparent medium being pressed to form a plurality of contiguous shallow pyramids, the face of the reflecting medium being composed of a multiplicity of inclined facets.

9. A reflector for rays of light including a clear glass transparent plate having its faces composed of a plurality of inclined surfaces, a coloring sheet back of the plate and a reflecting plate back of the coloring sheet having its face composed of a multiplicity of inclined facets.

10. A reflector for rays of light including a clear glass transparent plate having its face composed of a plurality of inclined surfaces, a coloring sheet back of the plate and a reflecting plate back of the coloring sheet having its face composed of a multiplicity of contiguous pyramidal facets.

11. A reflector for rays of light including a clear glass transparent plate having its face composed of a plurality of inclined surfaces, a coloring sheet back of the plate and a reflecting plate back of the coloring sheet having its face composed of a multiplicity of pyramidal facets inclined at three per cent from the base plate.

12. The method of coloring and diffusing rays of reflected light which consists in passing the same through a coloring medium associated with a transparent medium having its opposite faces composed of a plurality of correspondingly inclined faces, to and from a reflecting medium having a face composed of a multiplicity of inclined facets.

13. A reflector for rays of light including a transparent medium, a coloring medium associated with the transparent medium and a reflecting medium back of the transparent and coloring mediums, the opposite faces of the transparent medium being composed of a plurality of correspondingly inclined surfaces, and the face of the reflecting medium being composed of a multiplicity of inclined facets.

14. A reflector for rays of light including a transparent medium pressed to form a plurality of contiguous, shallow forms, a coloring medium associated with the transparent medium and a reflecting plate back of the transparent and coloring mediums.

15. A reflector for rays of light including a transparent medium pressed to form a plurality of contiguous, shallow pyramids, a coloring medium associated with the transparent medium and a reflecting plate back of the transparent and coloring mediums.

16. A reflector for rays of light including a transparent medium, a coloring medium associated with the transparent medium, each of said mediums being pressed to form a plurality of contiguous, shallow forms, and a reflecting medium back of the transparent and coloring medium.

17. A reflector for rays of light including a transparent medium, a coloring medium associated with the transparent medium, each of said mediums being pressed to form a plurality of contiguous, shallow forms, and a reflecting medium back of the transparent and coloring medium, said reflecting medium being pressed to form a plurality of contiguous, shallow forms.

18. A reflector for rays of light including a clear glass transparent plate pressed to form a plurality of contiguous, shallow pyramids, a coloring sheet back of the plate and a reflecting plate back of the coloring sheet.

19. A reflector for rays of light including a clear glass transparent plate pressed to form a plurality of contiguous, shallow pyramids, a coloring sheet back of the plate and a reflecting plate back of the coloring sheet having its face composed of a multiplicity of contiguous pyramidal facets.

PARKE G. MYERS.